United States Patent Office 3,645,914
Patented Feb. 29, 1972

3,645,914
CONVERSION OF INORGANIC OXIDES INTO EXTRUDABLE BINDERS
Edward J. Rosinski, Deptford, and Kenneth G. Simmons, Woodbury, N.J., assignors to Mobil Oil Corporation
No Drawing. Filed Mar. 19, 1969, Ser. No. 808,662
Int. Cl. B01j 11/40, 11/06
U.S. Cl. 252—455 R          18 Claims

ABSTRACT OF THE DISCLOSURE

A method of rendering solid synthetic hydrous metal oxides or modified natural metal oxides in the form of a powder smaller than about 20 mesh (Tyler) containing 1–30 weight percent water at 1000° F. suitable for catalysts, catalyst binder or catalyst support by a rehydration process employing liquid water and/or steam at temperatures above 100° F. for at least 0.25 hour effecting a hydration of 10–80 weight percent water.

BACKGROUND OF THE INVENTION

Field of the invention

This invention relates to a process for rendering synthetic hydrous inorganic oxides or modified natural oxides which are normally unsuitable as binder catalyst or catalyst support materials in composite catalyst compositions useful as binders, catalysts or catalyst supports for such compositions. More particularly, this invention relates to a method of rendering certain aluminaferous and other solid metal oxide compositions useful as binders, catalysts, or catalyst supports for catalyst compositions by hydration of at least a portion of the surface of the material under specified conditions.

DISCUSSION OF THE PRIOR ART

Many catalyst compositions especially those used in petroleum refining employ binder materials which enhance the physical characteristics of the catalysts and provide desired particle strength to withstand the rough handling and organic compound conversion conditions which are generally employed in such operations. Alumina and other metal oxides especially silica-alumina have been found to be desirable binder materials because of their beneficial catalytic effect with respect to certain organic compounds, such as hydrocarbons, and because of the durability which they impart to certain catalyst compositions especially chemically-modified zeolites. In fluid operations such as in fluidized catalytic cracking, the particles undergo substantial movement with respect to the hydrocarbon being cracked. Thus, binder materials are employed for the purpose of forming catalytic composites which have particle diameters between 20 and 200 microns, i.e., in the fluid range.

Composite catalysts can also be formed as extrudates. In forming these composite catalyst compositions containing binders such as alumina, the alumina is intimately admixed with the catalyst composition and extruded and the extrudates are cut into the desired particle length. The resultant particles may then be heated to activate the catalyst. It has been found that certain alumina particles especially those containing silica and prepared by a process involving drying cannot be extruded into a catalyst composition because they cannot with reasonable manipulation assume the workable consistency which is necessary in the extrusion operation. Some compositions have been rendered useful as binders by treatment with acid, but still other remain ineffective even after acid treatment with 5 percent acetic acid. It has, therefore, become desirable to provide a method of rendering certain alumina, as well as other inorganic oxide, compositions capable of rehydration useful as binders for catalysts, especially zeolite catalysts as well as catalysts and catalyst supports.

SUMMARY OF THE INVENTION

Broadly, this invention contemplates a method of rendering a solid particulate oxide, mixed oxide or modified natural oxide of a metal of Groups III–A, IV–A, IV–B, VI–B, magnesium and thorium having a water content between 1 and 30 percent by weight useful as a binder for catalyst compositions by the method which comprises hydrating said oxide at a temperature of at least 100° F. at a pH between about 5 and about 12 under conditions which maintain liquid water or steam in contact with said oxide under non-drying conditions with respect to said solid until at least a portion of the surface of the oxide has become hydrated to about 10–80 percent by weight water based on the weight of the hydrated oxide. The resulting composition is useful as a binder for catalyst compositions as a catalyst support or as a catalyst per se. In the process of the present invention, sufficient water is used to provide a solids content in the composite mixture between about 20 and about 90 percent, preferably between about 25 percent and about 50 percent by weight. The weight of solids in the mixture is defined as that weight which remains after calcination at 1000° F. to a constant weight.

DESCRIPTION OF SPECIFIC EMBODIMENTS

In a particularly desirable embodiment, this invention contemplates a method of preparing a composite zeolite catalyst composition which comprises intimately admixing a zeolite with a rehydratable synthetic solid hydrous metal oxide in dry particulate form having been partially dehydrated to a solids content of between about 70 and 99% by weight, rehydrating said solid metal oxide by contacting it with water at a temperature of at least 100° F. at a pH between about 5 and about 12 for at least 0.25 hour under conditions which maintain the presence of liquid water contact with said solid metal oxide using sufficient water for (10–80 weight percent water) mechanically shaping the admixture into particles, drying at 150–800° F., and if desired, heating the resultant particles to a temperature between 800 and 1700° F. to further harden said zeolite catalyst composition. It should be pointed out that by rehydrating the partially dehydrated hydrous metal oxide we mean that the product at this stage contains more water than the partially dehydrated material.

It has been found that certain inorganic metal oxides which are normally unsuitable for use as a binder, or catalyst supports for catalytic components can be made suitable by the method of the present invention. These metal oxides or modified natural metal oxides contain between about 70 and 99 percent by weight solids, the balance being water or other solvent employed during preparation. These rehydratable inorganic metal oxides which can be treated in accordance with the present invention are the oxides of metals of Groups IV–B, VI–B, III–A, IV–A of the Periodic Table, magnesium and thorium as well as mixtures of such oxides with other oxides of the type specified or with oxides which are not rehydratable pursuant to the present invention. The rehydratable oxides cna be dehydrated cogels, coprecipitates, sols and hydrous oxides. A number of the previously unsuitable inorganic oxides tested were spray dried alumina-silicas characterized by having a major portion of alumina and a minor portion of silica. When rehydrated according to the present invention, at least a portion of the surface of the particles is hydrated thereby converting the particles into an extrudable material.

As indicated above, the utilization of the method of the present invention is particularly significant in the preparation of catalyst compositions contaniing the binder material, catalysts or catalyst supports especially composite zeolite compositions. Zeolites which can be formed into composite catalyst compositions containing the binder material treated in accordance with the present invention include both natural crystalline zeolites and synthetic crystalline zeolites including ion exchange forms of such zeolites. Natural zeolites which can be incorporated into catalyst compositions together with the treated binder materials include gmelinite, chabazite, dachiardite, clinoptilolite, faujasite, heulandite, analcite, levynite, erionite, sodalite, cancrinite, nepheline, lazurite, scolecite, natrolite, offretite, mesolite, mordenite, brewsterite, ferrierite, and the like. Synthetic zeolites which can be incorporated into composite catalyst compositions containing the treated binder include zeolites X, Y, A, L, ZK-4, B, E, F, H, J, M, Q, T, W, Z, alpha, beta, also other quaternary ammonium zeolites, ZSM-4 and ZSM-5. These zeolites can have deposited or impregnated thereon hydrogenation components such as platinum, palladium, tungsten, molybdenum, cobalt, zinc, nickel and components thereof. These hydrogenation components can be in their elemental form or in an oxide or sulfide form.

Generally speaking, in forming catalyst particles the inorganic metal oxide is first treated with water under the rehydration conditions set forth above. These conditions include a temperature of at least 100° F. up to about 600° F. and a contact time of at least about 0.25 hour. The pressure applied will depend upon the temperature employed. Thus, when temperatures above 212° F. are employed, pressure such as autogenous pressure is applied to keep the liquid water in contact with the surfaces of the inorganic metal oxide being rehydrated. The pH of the mixture of inorganic oxide and water is at least about 5 and generally about 6 and less than about 12. To this end certain bases such as ammonium hydroxide, quaternary ammonium hydroxide, also basic or ammine salt solutions can be introduced in minor quantities in the water employed to rehydrate the inorganic metal oxide to facilitate the rehydration of the surface.

Thereafter, the rehydrated inorganic metal oxide which is now in an extrudable form is intimately mixed with catalyst particles. If necessary, a certain amount of water or other liquid can be added to adjust the consistency of the mixture to a paste-like consistency. The mixture is extruded through a standard extruding apparatus operating at pressures generally between several hundred and several thousand pounds per square inch. The extrudate is then cut into the desired particle length and the particles are dried 150–800° F. and the catalyst composition is further hardened, if desired by calcining at a temperature between 800 and 1700° F. for at least one hour. This method is preferred over rehydration in the presence of other catalytic materials especially crystalline zeolites, in that interaction may occur in the latter case which give less desirable catalytic properties.

An alternate, less preferred, method for accomplishing the substantially same effect is to intimately admix the zeolite or other catalyst composition with the inorganic oxide or support binder and then perform the rehydration of the mixture. The resultant rehydrated mixture comprising the catalyst and the rehydrated metal oxide is then extruded or otherwise mechanically formed into particles. The particles are dried and preferably calcined at a temperature of at least 800° F. for at least one hour to harden the composition. In either case, the calcination can be performed in an atmosphere such as air, nitrogen or steam and at atmospheric, subatmospheric pressures or superatmospheric pressures of several atmospheres. Other atmospheres could be used if desired such as: $H_2$, or $H_2S$, if reduction or sulfiding of promoting components is needed. The calcination can be accomplished in a catalytic reactor prior to use in an organic compound conversion reaction.

Alternate methods involve milling the inorganic metal oxide with water in an apparatus equipped with grinding means whereby frictional forces reduce the size of particles and also raise the temperature of the water to at least 100° F. and generally about 140° F. If excess water is used in this process, it can be removed by filtration. Another approach for rehydrating the metal oxide comprises contacting the same with water or steam maintained at a temperature above 100° F. through the application of external heat.

The inorganic oxide compositions which can be treated pursuant to the present invention are those which have been dried to a water content of between 1 and about 30 percent by weight water determined at 1000° F. If the composition has been previously dehydrated to less than 1 percent by weight water as by heating at a temperature in excess of 800° F., it is generally too stable for rehydration into a workable form. Conversely, if the water content of the inorganic oxide composition is greater than 30 percent by weight, it generally will not be a rigid solid. As such, it cannot be rehydrated to a material with optimum binding properties. However, such a composition can be rendered suitable by further drying to decrease the water content to between 1 and about 30 percent by weight determined at 1000° F.

An important aspect of the present invention resides in the fact that a metal oxide is being rehydrated. Thus previously partially dehydrated metal oxides are rendered useful as a catalyst binder by the specific rehydration procedure set forth above. The resultant product differs substantially from the initial form of the inorganic oxide and from forms of the oxides treated pursuant to prior art methods especially in terms of crushing strength at a given density. Differences in other physical properties are also observed. The reason for the observed differences in physical properties is not fully understood. One possible explanation resides in the fact when a hydrous oxide having a high water content is dried a homogenous gelatinous material is being dried. The resulting structure as measured, for example, by density and crushing strength, is determined by the size and shape of the micellar gel particles. However, when a partially dehydrated metal oxide is rehydrated, only the external surface of the dehydrated particles are rehydrated. The resultant particles have two solid phases—one dehydrated and the other rehydrated. When this material is dried, the resulting physical properties are thus determined by these two phases rather than by one. The density of the dried powder is generally lower than when a gelatinous material is dried directly, while the crushing strength may change very little. The preferred metal oxides are the synthetic metal oxides.

In order to more fully illustrate the nature of the present invention and the manner of practicing the same, the following examples are presented:

EXAMPLE 1

A spray dried alumina-silica containing about 5 percent by weight silica and having a particle diameter of about 20 to 200 microns was treated in the various experiments reported below and then employed as a binder material for a rare earth exchanged zeolite X catalyst having a residual sodium content of 0.68 weight percent. The composition of the alumina-silica was determined by X-ray analysis and contains between 70 and 85 percent alpha alumina monohydrate, between 10 and 15 percent beta alumina trihydrate and about 15 percent amorphous components. Various chemical analysis revealed that the composition had a sulfate content varying between 0.44 and 1.38 weight percent, a sodium content varying between .03 and 0.9 weight percent and a silica content varying between 0.85 and 5.99 weight percent. The balance was alumina. These aluminas after calcination at 1000° F.

had a surface area varying between 415 and 444 square meter per gram. The solids content determined at 1000° F. varied between 71 and 74 percent by weight, i.e., water content was 26 to 29 percent by weight.

In the table set forth below, there is indicated in Examples 2, 4 and 6 pretreatment with acetic acid, designated in the table as HAC. The mixing method set forth in the table is an abbreviated form for expressing the manner in which the mixture of binder material and catalyst was obtained. By way of example, in Example 1, the rare earth exchanged zeolite X was added to the alumina-silica and to that resultant mixture was added the water. The order of introduction of the other ingredients mentioned in Examples 2 through 9 inclusive is analogous to that of the method of Example 1.

commercial preparations of composite zeolite catalyst compositions.

The process of the present invention is particularly suitable in preparing composite catalyst comprising alumina and relatively new zeolites known as ZSM-4. ZSM-4 compositions can also be identified, in terms of mole ratios of oxides, as follows:

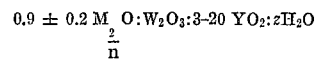

wherein M is a cation, $n$ is the valence of said cation, W is selected from the group consisting of aluminum and gallium, Y is selected from the group consisting of silicon and germanium, and $z$ is from 0 to 20. In the as synthesized

TABLE 1.—EXTRUSION OF SPRAY DRIED ALUMINA

| Example No. | 1 | 2 | 3 | 4 | 5 | 6 | 7 | 8 |
|---|---|---|---|---|---|---|---|---|
| Extrudate: | | | | | | | | |
| Crystalline alumino-silicate component: | | | | | | | | |
| Type | (1) | (1) | (1) | (1) | (1) | (1) | (1) | (1) |
| Conc., wt. percent | 80 | 80 | 80 | 80 | 80 | 80 | 80 | 80 |
| Alumina Component: | | | | | | | | |
| Source | (2) | (2) | (2) | (2) | (2) | (2) | (2) | (2) |
| Type | (3) | (3) | (3) | (3) | (3) | (3) | (3) | (3) |
| Conc., wt. percent | 20 | 20 | 20 | 20 | 20 | 20 | 20 | 20 |
| Pretreatment | (4) | | Dry milled 3 hours | (5) | | Dry milled 22 hours | (6) | (7) |
| Mixing method | Al₂O₃ ↓ REX ↓ H₂O | Al₂O₃ ↓ HAC+H₂O ↓ REX ↓ H₂O | Al₂O₃ ↓ H₂O ↓ REX ↓ H₂O | Al₂O₃ ↓ H₂O+HAC ↓ REX ↓ H₂O | Al₂O₃ ↓ H₂O ↓ REX ↓ H₂O | Al₂O₃ ↓ HAC+H₂O ↓ REX ↓ H₂O | Al₂O₃ ↓ REX ↓ H₂O | Al₂O₃ ↓ REX ↓ H₂O |
| Extrusion: | (8) | (8) | (8) | (8) | (8) | (8) | | |
| Pressure, tons, lbs./sq. in | | | | | | | ~1,300 | ~1,600 |
| Size, In. D | | | | | | | 3/32 | 3/32 |
| Processing: | | | | | | | | |
| Drying: | | | | | | | | |
| Time, hr | | | | | | | 17 | 19 |
| Temp., °F | | | | | | | 230 | 230 |
| Calcining: | | | | | | | | |
| Time, hr | | | | | | | 3 | 3 |
| Temp., °F | | | | | | | 1,000 | 1,000 |
| Properties: | | | | | | | | |
| Surface area, m.²/g | | | | | | | | |
| Density, g./cc | | | | | | | | |
| Pore volume, cc./g | | | | | | | | |
| Crushing: | | | | | | | | |
| Avg. lb | | | | | | | 20 | 18 |
| Lb./in | | | | | | | 58 | 60 |

1 REX 0.68 wt. percent residual sodium.
2 Spray dried alumina.
3 15% amorphous 70–85% Al₂O₃.H₂O (15% beta Al₂O₃.3H₂O).
4 None.
5 5% HAC on Al₂O₃.
6 Wet milled 72 hours (approx. 140° F.).
7 Heat treated 24 hr. at 200° F. in 20% slurry.
8 Impossible.

In Examples 7 and 8 above, the temperature of the water was about 140° F. and 200° F. during the rehydration procedure. The crushing strength refers to the average crushing strength in pounds force necessary to crush each pellet, employing 25 pellets in the test. The designation lb./in. refers to the computed average pounds force necessary to crush pellets having a hypothetic length of one inch. It is, of course, understood that crushing strength comparisons are generally made on pellets having the same diameter. Smaller diameter pellets are softer while larger pellets would be stronger.

From the data set forth in Table 1 above, it is seen that the rehydration procedure of the present invention enables utilization of this spray dried alumina-silica where otherwise without such treatment, the binder material would be an ineffecttive composition for admixture with the catalyst component. The rehydrated material in admixture with the zeolite can be extruded under the various pressures employed. It will be noted from the data above that the same binder composition when rehydrated in accordance with the instant process can be extruded at pressures between about 600 and 3000 pounds per square inch, thus enabling utilization of this binder material in aluminosilicate form, the zeolite has a formula, in terms of mole ratios of oxides, as follows:

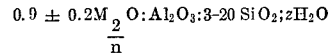

and M is selected from the group consisting of a mixture of tetramethylammonium cations and alkali metal cations, especially sodium. The original cations can be at present so that the amount of tetramethylammonium cations is between 1 and 50 percent of the total amount of the original cations. Thus, the zeolites can be expressed by the following formula, in terms of mole ratios of oxides:

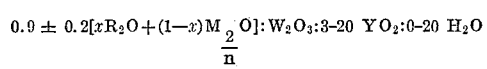

wherein W and Y have the previously assigned significance, R is tetramethylammonium, M is an alkali metal cation and $x$ is between 0.01 and 0.50.

Members of the family of ZSM-4 zeolites posses a definite distinguishing crystalline structure whose X-ray diffraction pattern has the following values:

TABLE 2

| Interplanar spacing $d$(A) | Relative intensity |
| --- | --- |
| 9.1±.2 | vs. |
| 7.94±.1 | mw. |
| 6.90±.1 | m. |
| 5.97±.07 | s. |
| 5.50±.05 | mw. |
| 5.27±.05 | mw. |
| 4.71±.05 | mw. |
| 4.39±.05 | w. |
| 3.96±.05 | w. |
| 3.80±.05 | s. |
| 3.71±.05 | m. |
| 3.63±.05 | m. |
| 3.52±.05 | s. |
| 3.44±.05 | m. |
| 3.16±.05 | s. |
| 3.09±.05 | m. |
| 3.04±.05 | m. |
| 2.98±.05 | m. |
| 2.92±.05 | s. |

These values were determined by standard techniques. The radiation was the K-alpha doublet of copper, and a Geiger counter spectrometer with a strip chart pen recorder was used. The peak heights, I, and the positions as a function of 2 times theta, where theta is the Bragg angle, were read from the spectrometer chart. From these, the relative intensities, 100 $I/I_0$, where $I_0$ is the intensity of the strongest line or peak, and $d$ (obs.), the interplanar spacing in A., corresponding to the recorded lines, were calculated. In Table 2 the relative intensities are given in terms of the symbols s.=strong, m.=medium, ms.=medium strong, mw.=medium weak and vs.=very strong.

Zeolite ZSM-4 can be suitably prepared by preparing a solution containing $R_2O$, sodium oxide, an oxide of aluminum or gallium, an oxide of silica or germanium, and water and having a composition, in term of mole ratios of oxides, falling within the following ranges:

TABLE 3

|  | Broad | Preferred |
| --- | --- | --- |
| $Na_2O/R_2O+Na_2O$ | .31 to <1 | .75 to .99. |
| $R_2O+Na_2O/YO_2$ | .05 to .90 | .15 to .75. |
| $YO_2/W_2O_3$ | 3 to 60 | 6 to 30. |
| $H_2O/R_2O+Na_2/O$ | 15 to 600 | 20 to 150. | wherein R is a tetramethylammonium cation, W is aluminum or gallium and Y is silicon or germanium maintaining the mixture until crystals of the zeolite are formed. Thereafter, the crystals are separated from the liquid and recovered. ZSM-4 is preferably formed as an aluminosilicate.

EXAMPLE 9

(A) Preparation of extruded ZSM-4 alumina catalysts

An extruded ZSM-4 alumina catalyst was formed by extruding a composite blend containing 65 weight percent acid ZSM-4 having a sodium content of 0.17 weight percent as $NH_4ZSM$-4 form dried at 230° F. and 35 weight percent alumina-silica (5.99 $SiO_2$) alumina rehydrated through heat treatment with water at 200° F.

The ZSM-4 was prepared initially in a sodium tetramethylammonium aluminosilicate form through the interaction of the following composition, expressed in terms of mole ratios of oxides: 5.56 $Na_2O$ : 0.396 $(TMA)_2O$ : 1.0 $Al_2O_3$ : 16.9 $SiO_2$ : 5.06 $Na_2SO_4$ : 0.794 NaCl : 352 $H_2O$, TMA=tetramethylammonium.

The composition was achieved by mixing a caustic soda-tetramethylammonium chloride sodium silicate solution with aluminum sulfate-sulfuric acid solution at 212–218° F. and reacting at this temperature for 76.5 hours yielding a ZSM-4 having good crystallinity. The product analyzed 7.31 weight percent sodium, 18.7 weight percent alumina, 72.5 weight percent silica and 0.79 weight percent nitrogen.

The resulting sodium quaternary ammonium ZSM-4 was then base exchanged semi-continuously with about 25 weight percent solution of $(NH_4)_2SO_4$ at 120-200° F. for four contacts using about one pound $(NH_4)_2SO_4$ per pound of alkali ZSM-4 per contact, washed free of sulfate ion, and dried at 230° F. This dried material was contacted twice more with same solution and washed, reducing the residual sodium to 0.17 weight percent. After redrying, the resulting ammonium ZSM-4 was used in preparing the subsequent catalyst.

In preparing the extrudate, a spray dried, 20 to 200 microns alumina-silica (5.99 percent $SiO_2$) (15 percent amorphous, 70 percent alpha $Al_2O_3 \cdot H_2O$, 10 percent beta $Al_2O_3 \cdot 3H_2O$) containing about 25 percent water was first hydrated by mixing 10 pounds of alumina-silica with 11.26 pounds of water and placing in a sealed container for about 18 hours at 200° F. To 654 grams of this hydrated alumina (36.4 weight percent solid as determined at 1000° F.) was added 100 cc. of water in a Muller mixer. To this was then added 535 grams $NH_4$ ZSM-4 (82.9 weight percent solids determined at 1000° F.) prepared as described above along with an additional 110 cc. water. The resulting dough-like mixture was extruded hydraulically through 1/32 inch holes. The wet extrudate was dried at 230° F., and calcined for 10 hours at 950° F. with 3 volumes per volume of catalyst of air saturated with water at about 80° F.

The final catalyst having a density of 0.486 g./cc. had a crushing strength of 5 pounds average for 25 pellets and a calculated average strength per inch of pellets of 19 pounds. The final surface area was 389 m.²/g.

(B) Preparation of catalyst for hydrodesulfurization

Preparation of these low density high pore volume catalysts involved blending all the components; $Co(NO_3)_2$, ammonium molybdate (87.5 percent $MoO_3$), spray dried alumina-silica and water, followed by heat treating at 200° F. and then by extrusion to 1/25 inch diameter pellets. These catalysts preparations demonstrate the application of the rehydration method to convert inorganic oxides into desirable supports for catalytic components.

Preparational details consisted of mixing in a Muller mixer; 691 grams alumina-silica (5.99 percent $SiO_2$) 74.4 percent solids determined at 1000° F., 87.2 grams ammonium molybdate (72.0 grams $MoO_3$) and then adding a solution of 58.7 grams $Co(NO_3)_2 \cdot 6H_2O$ in 750 ml. $H_2O$ and a solution containing 27.1 m. ethylorthosilicate, 20 ml. of a mixture of 90 percent by volume ethyl alcohol and 10 percent by volume methanol and 1.97 ml. 4N·$HNO_3$. Mixing was continued for a half hour period. The resulting dough-like mixture was subsequently heat treated for 21 hours at 200° F. in a sealed container. The pH of this mixture during the heat treatment was 5.3. The solids content of this rehydrated mixture was 37 percent by weight. Following the heat treatment the composite was re-mixed in a Muller mixer with an added 65 ml. $H_2O$. The product was extruded hydraulically through 1/25 hole in a die plate, exerting a pressure of 8 tons (about 1500 p.s.i.g.) on a 4 inch diameter piston. Following the extrusion, the catalyst was dried at 230° F. for 21 hours, and calcined at 1000° F. with 3 volumes of air per volume of catalyst.

The final catalyst had unexpectedly an exeptionally low density 0.41 g./cc., a high pore volume 1.02 cc./g. and a good hardness, 5.5 pounds average crushing strength for 25 pellets with an average of 18 pounds per inch of pellets. The surface area was 396 m.²/g. Composition by analysis was as follows: CoO, 2.72 weight percent, 10 weight percent $MoO_3$, and 6.47 weight percent $SiO_2$. The low density and high porosity combined with good strength are very desirable catalyst properties particularly in applications employing some liquid phase reactants.

This catalyst was used successfully to desulfurize a 6° API Kuwait Resid containing 5.25 weight percent sulfur at 2500 p.s.i.g., 1 liquid hourly space velocity, using 6000 s.c.f./bbl. $H_2$.

(C) Effect of silica content of the starting alumina on the porosity of finished catalysts In preparing hydrodesulfurization (HDS) supported catalysts of the type discussed above, it was found that the porosity of the final catalyst was related to the silica content of the starting alumina-silica. In this study a series of catalysts were prepared by first rehydrating a series of aluminas of the same type as that used in Example 1 except for variation in silica content. These hydrated aluminas (containing 0, 1.2 and 5.99 percent $SiO_2$) were then extruded through holes 1/32 inch in diameter, then dried at 230° F. and calcined for 10 hours at 1000° F. The calcined extrudates were finally impregnated with a combined solution of $Co(NO_3)_2$ and ammonium molybdate in water to deposit about 3.75 weight percent CoO and 18 percent $MoO_3$, in each case. After the impregnation, the wet catalyst was dried at 230° F., and re-calcined at 1000° F.

Resulting physical properties are summarized in the following table.

TABLE 4
Preparation of Hydrodesulfurization Catalysts of Variable Density

| Preparation No. | C-1 | C-2 | C-4 |
|---|---|---|---|
| $SiO_2$/ content, wt. percent of alumina | 0 | 1.2 | 5.99 |
| Physical properties: | | | |
| Density, g./cc | 0.72 | 0.63 | 0.49 |
| Pore vol., cc./g | 0.61 | 0.63 | 0.87 |
| Crushing strength: | | | |
| 25 pellet average, lbs | 5 | 8 | 6 |
| Lbs. per inch | 20 | 32 | 23 |

These data show that one of the important criteria controlling catalyst density is the silica content of the alumina. The aluminas containing higher silica content produce lower density catalysts or catalyst supports. Aluminas having between about 1 and about 10% silica are preferred.

Other advantages which can result through the use of the method of rehydrating spray dried particles are the preparation of catalyst particles having low density, high pore volume and good physical strength. All of these properties are highly desirable features for good catalysts.

The descriptive preparational details involved in preparing the above catalysts are as follows:

Preparation of extrudate of Examples C-3.—808 grams of the spray dried alumina employed above for preparation C-3 which was alumina-silica (5.99 weight percent $SiO_2$) was mixed with 910 grams water (35 percent solids) placed in a sealed container and held for 19 hours at 195° F. After the heat treatment, the hydrated alumina was remixed in a Muller mixer with an additional 100 ml. $H_2O$ and hydraulically extruded (1/32 inch), dried at 230° F. and calcined 10 hours at 1000° F. with 3 volume of air per volume of catalysts.

Preparation of impregnated catalyst C-3.—In preparing the impregnated catalyst 151 grams of the above extrudate was first evacuated, then impregnated over a 2 minute period by adding a solution of 25.2 grams $Co(NO_3)_3 \cdot 6H_2O$ in 70 ml. $H_2O$ with a solution of 42 grams ammonium molybdate (83 percent $MoO_3$) in 100 ml. $H_2O$, this solution was adjusted to a final volume of 204 ml. This volume represents the total volume of liquid adsorbable by the evacuated extrudate. After impregnation, the catalyst was dried at 230° F. in air for 20 hours and finally calcined for 10 hours at 1000° F. with 3 volume air per volume of catalyst. Properties of this catalyst are summarized in the preceding table.

Catalyst C-2 was also prepared in a manner quite similar to that discussed above, with the exception that the spray dried alumina contained 1.2 weight percent $SiO_2$.

Catalyst C-1 was prepared using an alumina that was received as wet cake and room temperature aged about 2 months resulting in some alumina phase transformation. The alumina was filtered, batch dried at 230° F. and extruded by simple rehydration in the Muller mixer.

(D) Hydration treatment to produce an alumina catalyst or catalyst support

The following examples will serve to demonstate the particular advantages of the hydration step when applied to pure alumina $\alpha Al_2O_3 \cdot H_2O$ (77.6 weight percent solids determined at 1000° F.). These examples were prepared employing a commercially available $\alpha Al_2O_3 \cdot H_2O$ that was further pulverized by hammer milling through a 0.008 inch mesh screen. In preparing Example D-1 the alumina was mixed with water and then extruded while in preparing Example D-2 the alumina was first contacted with the same amount of water and then heat treated in a closed vessel for 24 hours at 200° F. before extruding. Preparational details were as follows:

EXAMPLE D-1

In preparing this example, 1287 grams of the milled $\alpha Al_2O_3 \cdot H_2O$ (77.6 weight percent solids determined at 1000° F.) was charged to a Muller mixer along with 700 ml. water and mixed for one hour to dough-like mixture 50.5 weight percent solids calculated from starting alumina and added water. This mixture was then extruded hydraulically twice through a die plate containing 1/16 inch holes under an extrusion pressure of about 1900 p.s.i. The resulting wet product was air dried at 230° F. for 19 hours and calcined for 10 hours at 1000° F., using 3 volumes of air per volume of catalyst. The resulting product was tested for particle crushing strength as before described. Results of this crushing test are presented in the table following Example D-2.

EXAMPLE D-2

This examples was prepared using the same quantities of same alumina discussed above and the same mixing, extrusion, drying and calcining methods also discussed in Example 1. However, this example differs only in that the alumina powder was contacted with the water in a sealed container at about 8.7 pH for 21 hours at 200° F. prior to mixing and extruding.

The comparative crushing strength of these two preparations clearly show the particular advantages for the hydration step employed in our process.

TABLE 5.—CRUSHING STRENGTH OF FINISH EXTRUDATE

| | Example D-1 no hydration | Example D-2 hydrated |
|---|---|---|
| Crushing strength, lbs. force: | | |
| 25 pellet average | 5 | 8 |
| Lbs. per inch of catalyst | 20 | 32 |

Advantages for the catalyst having a higher crushing strength are well understood in commercial application. The catalyst with increased crushing strength has much better applicability in processes employing catalyst handling and catalyst movement. Soft catalysts crumble which can cause much dusting with possible unit plugging.

(E) Preparation of oxidation catalyst

The following examples serve to illustrate the process of the invention as applied to the preparation of catalyst for oxidative conversion of automotive exhaust.

EXAMPLE 2

This catalyst involves the preparation of two components (1) a $CuO-Cr_2O_3$ was first prepared (2) then blended with the alumina-silica followed by the rehydration process, extrusion, drying and calcination.

(1) Preparation of the CuO—Cr$_2$O$_3$.—In preparing the CuO—Cr$_2$O$_3$, two solutions were mixed together forming a precipitate. These solutions were:

Solution (A):
  436 g. Cu(NO$_3$)$_2$·3H$_2$O
  1600 ml. H$_2$O
  2.9 ml. HNO$_3$ heated to 70° C.

Solution (B):
  252 g. (NH$_4$)$_2$Cr$_2$O$_7$
  1600 ml. H$_2$O
  317.2 ml. NH$_4$OH (29.7 wt. percent NH$_3$) heated to 70° F.

These solutions were mixed together adding Solution B to Solution A at 70° C., holding the solution temperature at 70–74° C. while stirring for ½ hour. The mixture was filtered to wet cake, and the wet cake was washed with 4 liters of water. After washing, the wet cake was dried to 230° F. for 20 hours followed by calcination in air at 800° F. for 3 hours. The calcined product was contacted 4 times with stirring, 15 minutes with 4 liters of 10 percent acetic acid solution at room temperature. This cake was then filtered between each contact and finally washed with 4 liters of water. As processed, the wet cake contained 45.8 weight percent solids determined by calcining for 2 hours at 1000° F. The resulting wet cake was used in preparing the subsequent catalyst.

(2) Preparation of the composite catalyst.—To 131 grams of the above wet cake, constituting 20 weight percent CuO—Cr$_2$O$_3$ on the final catalyst basis, was added 323 grams alumina-silica containing 5.99 weight percent silica (74.05 weight percent solids determined at 1000° F.). These components were mixed in a Muller mixer until uniform consistency was obtained, requiring 15 minutes. To this uniform mixture was added 200 ml. water and mixed for an additional half hour period. At this point, the mixture containing 34.2 weight percent water was placed in a sealed container and held for 17 hours at 200° F. to rehydrate the alumina-silica support for the CuO—Cr$_2$O$_3$ component. After this rehydration, the composite was mixed in a Muller mixer with an added 90 ml. of water for ½ hour and then extruded hydraulically through a die containing $\frac{1}{16}$ inch diameter holes, requiring about 1360 pounds per square inch pressure.

The extruded catalyst was air dried for 22 hours at 230° F. followed by air calcination for 3 hours at 1400° F. The final catalyst had a surface area of 214 m.$^2$/g., an apparent density of 0.44 g./cc. and a pore volume of 0.97 cc. per gram. When tested for crushing strength, it was found that an average force of 6 pounds was required to crush the 25 pellets tested and an average of 21 pounds per inch force was computed from these 25 individual pellets.

This catalyst was tested for oxidative conversion of CO and C$_3$H$_6$ as a measure of the catalyst's ability to oxidize automotive exhaust emission. It was found that this catalyst, after a pretreatment with a 15 percent steam atmosphere for 24 hours at 1400° F., had the ability to oxidize $5.8 \times 10^{-2}$ volume of CO per volume of catalyst per minute to an 80 percent conversion and to oxidize $6.7 \times 10^{-2}$ volume of C$_3$H$_6$ per volume of catalyst per minute to 80 percent conversion level. The catalytic evaluation was conducted at 750° F. with these gases.

In addition to employing zeolite and other catalyst compositions in combination with the binders treated pursuant in accordance with the present invention, it should be mentioned that other compositions, especially ores, including those of manganese and compositions of oxides of copper and chromium as well as copper chromite (CuO—Cr$_2$O$_3$) oxidation type catalyst can be incorporated with the treated binder or support. In addition, the alumina-silica is a very effective support for catalysts of the CoO—MoO$_3$ type useful in hydrodesulfurization. When composite catalyst compositions are activated, the resultant catalyst composition can be characterized by an exceptional high porosity. Surface rehydration of fluid size alumina-silica particles, i.e., those particles having a particle diameter of about 20 to 200 microns has led to the preparation of ultra-high porosity low density hard extrudates. The porosity of the resultant alumina-silica particles is generally between 0.8 and 1.4 cc./g. pore volume and the density varies between 0.3 and 0.5 g./cc., thus making the alumina-silica exceptionally useful as a binder material catalyst, or catalyst support in a number of hydrocarbon conversion reactions.

The terms and expressions, as used herein, have been used as terms of description and not of limitation, as there is no intention, in the use of such terms and expressions, of excluding any equivalents or portions thereof, as various modifications and departures are possible within the scope of the invention claimed.

We claim:

1. A method of rendering a rehydratable solid inorganic particulate oxide or mixed oxide of a metal of Groups III–A, IV–A, IV–B, VI–B, magnesium or thorium having a water content between 1 and 30 percent by weight useful as a binder for catalyst compositions by the method which comprises hydrating said oxide at a temperature of at least 100° F. at a pH between about 5 and about 12 under conditions which maintain liquid water or steam in contact with said oxide under non-drying conditions with respect to said solid until at least a portion of the surface of the oxide has become hydrated to about 10–80 percent by weight water based on the weight of the hydrated oxide.

2. A method according to claim 1 wherein said particulate oxide is an alumina.

3. A method according to claim 1 wherein said particulate oxide is rehydrated in the presence of a zeolite catalyst composition.

4. A method according to claim 1 wherein the temperature is between 100° F. and 600° F. and the pH is above about 6.

5. A method according to claim 2 wherein said alumina contains between about 1 and about 10 weight percent of silica, said alumina is intimately combined with a crystalline zeolite catalyst composition and the resultant mixture is shaped into particles which are thereafter heated to a temperature of between 400 and 1500° F.

6. A process according to claim 5 wherein said zeolite is a rare earth form of zeolite X.

7. A method according to claim 5 wherein said alumina is wet milled in an aqueous medium maintained at a temperature of at least 100° F.

8. A method according to claim 5 wherein said alumina is rehydrated by contacting the same with water maintained at a temperature above 100° F. through the application of external heat.

9. A catalyst support comprising a rehydrated synthetic metal oxide, initially having a solids content between 70 and 99 percent by weight, said metal being a metal of Groups III–A, IV–A, IV–B, VI–B, magnesium or thorium, said support having two phases, one of said phases at the external surface of the support and the other phase being within the interior of said support.

10. A catalyst composition comprising a synthetic faujasite of the X or Y variety and a rehydrated synthetic solid oxide binder initially having a water content prior to rehydration between 1 and 30 percent by weight, said binder having two phases, one of said phases at the external surface of the binder and the other phase being within the interior of said binder.

11. A catalyst composition according to claim 10 wherein the synthetic faujasite is a rare earth exchanged form of zeolite X.

12. A catalyst composition according to claim 10 wherein said synthetic faujasite is a rare earth exchanged form of zeolite Y.

13. A catalyst composition according to claim 9 wherein said rehydratable oxide contains a metal chosen from the group consisting of Group VI–B and Group VIII metals.

14. A catalyst composition according to claim 9 wherein said rehydratable metal oxide contains cobalt and molybdenum.

15. A catalyst composition according to claim 14 wherein said composition contains nickel.

16. A catalyst composition according to claim 9 wherein said rehydratable metal oxide contains platinum.

17. A catalyst composition according to claim 9 wherein said rehydratable metal oxide comprises an alumina containing 1 to 10 wt. percent silica, said catalyst support contains an amount of copper oxide and chromium oxide.

18. A catalyst composition according to claim 9 wherein said rehydratable metal oxide comprises an alumina containing 1 to 10 wt. percent silica, said catalyst support contains an amount of cobalt and molybdenum.

References Cited
UNITED STATES PATENTS

| | | | |
|---|---|---|---|
| 3,355,396 | 11/1967 | Otremba et al. | 252—455 X |
| 3,380,933 | 4/1968 | Michel et al. | 252—455 |
| 3,390,100 | 6/1968 | Chomitz et al. | 252—455 |
| 3,391,075 | 7/1968 | Plank et al. | 252—455 X |
| 3,403,109 | 9/1968 | Colgan et al. | 252—455 X |

DANIEL E. WYMAN, Primary Examiner

C. F. DEES, Assistant Examiner

U.S. Cl. X.R.

252—455 Z, 461, 463, 467, 475

PO-1050
(5/69)

UNITED STATES PATENT OFFICE
CERTIFICATE OF CORRECTION

Patent No. 3,645,914          Dated February 29, 1972

Inventor(s) Edward J. Rosinski and Kenneth G. Simmons

It is certified that error appears in the above-identified patent and that said Letters Patent are hereby corrected as shown below:

Table I, Column 2
  Pretreatment
"_____" should read --HAC--

Column 7, line 46
"$H_2O/R_2O + Na_2/O$" should read --$H_2O/R_2O + Na_2O$--

Table 4, Column 9
  Line 29
"C-4" should read --C-3--

Signed and sealed this 1st day of August 1972.

(SEAL)
Attest:

EDWARD M. FLETCHER, JR.          ROBERT GOTTSCHALK
Attesting Officer                Commissioner of Patents